(12) United States Patent
Tsukada et al.

(10) Patent No.: US 8,210,063 B2
(45) Date of Patent: Jul. 3, 2012

(54) TWIN CLUTCH TYPE SPEED-CHANGE APPARATUS

(75) Inventors: Yoshiaki Tsukada, Saitama (JP); Takashi Ozeki, Saitama (JP); Hiroyuki Kojima, Saitama (JP); Yoshiaki Nedachi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 875 days.

(21) Appl. No.: 12/210,479

(22) Filed: Sep. 15, 2008

(65) Prior Publication Data

US 2009/0084209 A1 Apr. 2, 2009

(30) Foreign Application Priority Data

Sep. 28, 2007 (JP) ................................. 2007-255124

(51) Int. Cl.
*F16H 19/08* (2006.01)
(52) U.S. Cl. .......................................................... 74/33
(58) Field of Classification Search .................... 74/329, 74/330, 335, 337.5, 339, 340, 473.1, 473.36, 74/473.11; 192/69.71, 69.62, 108
See application file for complete search history.

(56) References Cited

U.S. PATENT DOCUMENTS

| 6,354,417 B1 * | 3/2002 | Narita et al. ............... 192/69.71 |
|---|---|---|
| 7,367,923 B2 * | 5/2008 | Zenno et al. ................... 477/180 |
| 7,387,042 B2 * | 6/2008 | Suzuki et al. .................... 74/335 |
| 7,752,936 B2 * | 7/2010 | Kobayashi et al. .......... 74/337.5 |
| 2008/0078265 A1 * | 4/2008 | Shiozaki et al. ........... 74/473.12 |

FOREIGN PATENT DOCUMENTS

| JP | 2006-153235 A | 6/2006 |
|---|---|---|
| WO | WO-2008/038797 A1 | 4/2008 |
| WO | WO-2008/041429 A1 | 4/2008 |

* cited by examiner

*Primary Examiner* — David D Le
*Assistant Examiner* — David J Hlavka
(74) *Attorney, Agent, or Firm* — Birch, Stewart, Kolasch & Birch, LLP

(57) ABSTRACT

A twin clutch type speed-change apparatus applies a dog clutch to speed-change gears slid on a main shaft and a counter shaft for changing the number of speed-change steps. A twin clutch type speed-change apparatus includes a transmission having a plurality of gear pairs between a main shaft and a countershaft and a twin clutch. The rotational drive force of the engine is connected/disconnected between the transmission and the engine by the twin clutch. A dog clutch with dog teeth and a dog hole is applied between an axially slidably attached slidable gear and an axially non-slidably attached non-slidable gear to select an on gear pair for transmitting the rotational drive gear, from a plurality of gear pairs in the transmission. Rotational drive force is transmitted between the slidable gear slid by a shift fork and the coaxially adjacent non-slidable gear by engagement of the dog clutch.

14 Claims, 6 Drawing Sheets

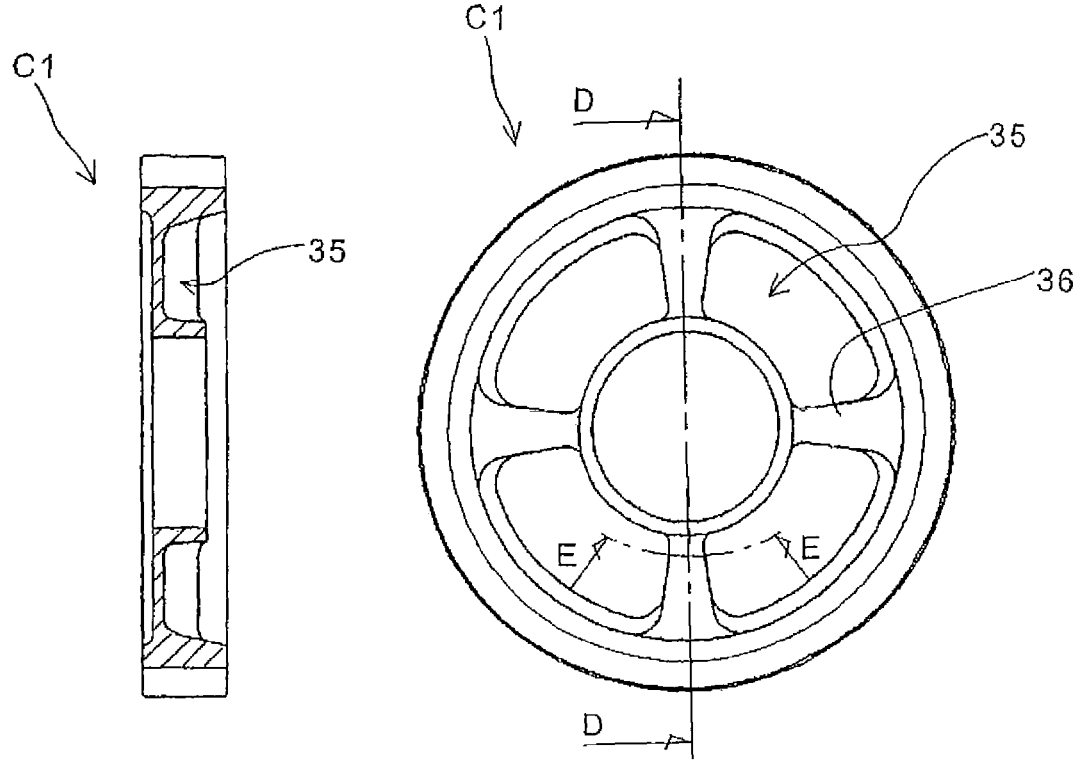
FIG. 5(b)     FIG. 5(a)
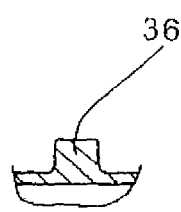
FIG. 6

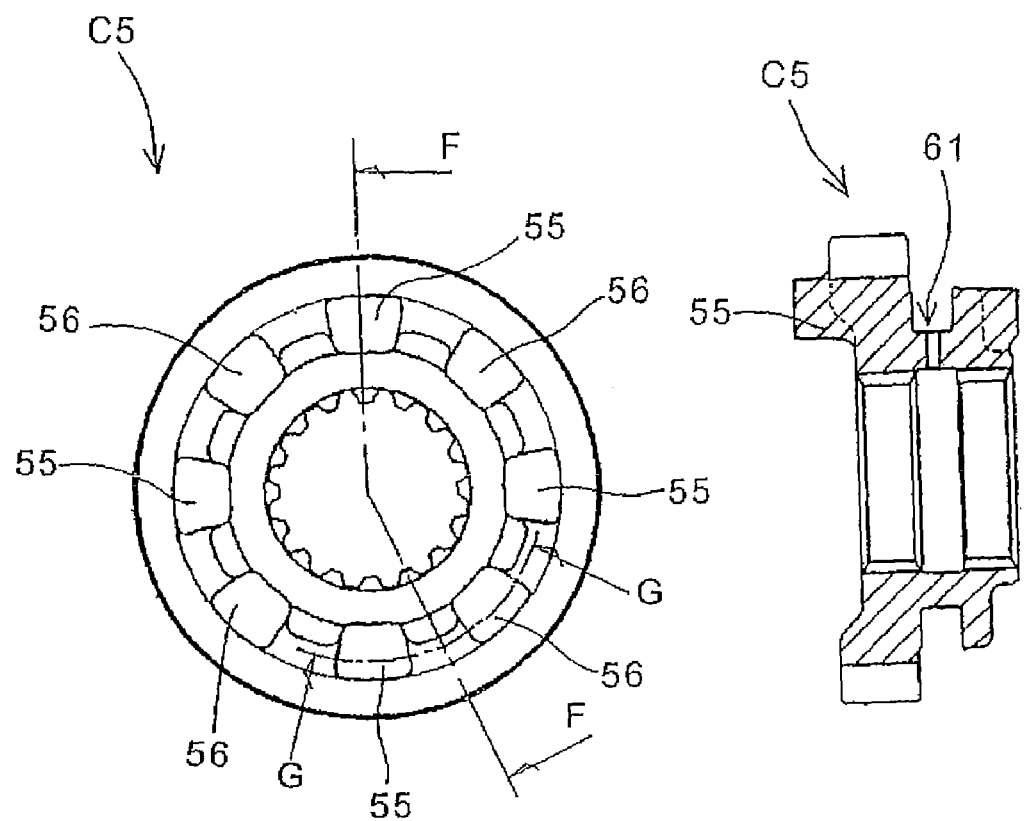
FIG. 7(a)  FIG. 7(b)
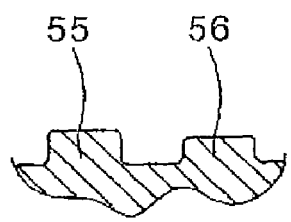
FIG. 8

TWIN CLUTCH TYPE SPEED-CHANGE APPARATUS

CROSS-REFERENCE TO RELATED APPLICATIONS

The present application claims priority under 35 USC 119 to Japanese Patent Application No. 2007-255124 filed on Sep. 28, 2007 the entire contents of which are hereby incorporated by reference.

BACKGROUND OF TEE INVENTION

1. Field of the Invention

The present invention relates to twin clutch type speed-change apparatuses and, in particular, to a twin clutch type speed-change apparatus that applies a dog clutch to speed-change gears that slide on a main shaft and a countershaft for changing the number of speed-change steps.

2. Description of Background Art

A multi-step transmission is known wherein a plurality of speed-change gear pairs are configured such that shifting operation is executed to allow shift forks sliding parallel to a main shaft and to a countershaft to drive speed-change gears and sleeves slidable on the main shaft and the countershaft. An automatic transmission is also known that eliminates the operator's shifting operation by allowing an actuator such as an electric motor or the like to drive such shift forks.

Japanese Patent Laid-Open No. 2006-153235 discloses an automatic transmission allowing an actuator to drive shift forks configured to apply a synchromesh mechanism to a sleeve driven by the shift fork to reduce shift shock during shifting.

The synchromesh mechanism as shown in Japanese Patent Laid-Open No. 2006-153235 is composed of a plurality of parts to synchronize the rotating speeds of gears. Thus; the structure is complicated and the weight of the transmission may probably increase.

A twin clutch type speed-change apparatus may be configured to include a twin clutch composed of a first clutch and a second clutch so that a shifting operation can be enabled between two adjacent speed-change steps by switching the engaging/disengaging states between the first clutch and the second clutch. In such a case, it is desired to simplify the structure without use of the above-mentioned synchromesh mechanism.

SUMMARY AND OBJECTS OF THE INVENTION

It is an object of an embodiment of the present invention to solve the problem of the existing technique described above and to provide a twin clutch type speed-change apparatus that applies a dog clutch to speed-change gears slid on a main shaft and a counter shaft for changing the number of speed-change steps.

To achieve the above object, according to an embodiment of the present invention a twin clutch type speed-change apparatus including a transmission having a plurality of gear pairs disposed between a main shaft and a countershaft and a twin clutch provided on the main shaft. A rotational drive force from a power source is connected/disconnected between the transmission and the power source by the twin clutch. The main shaft is composed of an inner tube carrying odd speed-change step gears and an outer tube carrying even speed-change step gears. The twin clutch includes a first clutch adapted to connect/disconnect a rotational drive force transmitted to the inner tube and a second clutch adapted to connect/disconnect a rotational drive force to the outer tube; the gear pairs are each composed of an axially slidably attached slidable gear and axially non-slidably attached non-slidable gear to select one gear pair for transmitting the rotational drive force to the countershaft. The slidable gears are each provided on a corresponding one of the inner tube, the outer tube and the countershaft and are each slid by a corresponding one of shift forks each engaging a corresponding one of the slidable gears to connect/disconnect the rotational drive force between the slidable gear and the non-slidable gear coaxially adjacent thereto. A dog clutch is applied to between the slidable gear and the non-slidable gear coaxially adjacent to the slidable gear to transmit a rotational drive force by engagement of a dog tooth with a dog hole.

According to an embodiment of the present invention, a dog hole is formed in one, having a larger outside diameter, of the slidable gear and the non-slidable gear.

According to an embodiment of the present invention, the shift fork is slidably attached to a guide shaft arranged parallel to the main shaft and to the countershaft and is slid along with turning of a shift drum provided parallel to the guide shaft.

According to an embodiment of the present invention, two of the guide shafts are provided for the shift forks, one of the guide shafts is attached with at least one shift fork adapted to drive the main shaft side slidable gear, and the other guide shaft is attached with at least one shift fork adapted to drive the countershaft side slidable gear.

According to an embodiment of the present invention, the twin clutch type speed-change apparatus is configured such that shifting between speed-change steps adjacent to each other by switching engaging and disengaging states of the twin clutch can be enabled by simultaneously engaging a dog clutch to be engaged when a rotational drive force is transmitted at a predetermined speed-change step and a dog clutch to be engaged when a rotational drive force is transmitted at a speed-change step adjacent to the predetermined speed-change step.

According to an embodiment of the present invention, the main shaft is composed of an inner tube carrying odd speed-change step gears and an outer tube carrying even speed-change step gears. The twin clutch includes a first clutch adapted to connect/disconnect a rotational drive force transmitted to the inner tube and a second clutch adapted to connect/disconnect a rotational drive force to the outer tube. The gear pairs are each composed of an axially slidably attached slidable gear and axially non-slidably attached non-slidable gear to select one gear pair for transmitting the rotational drive force to the countershaft. The slidable gears are each provided on a corresponding one of the inner tube, the outer tube and the countershaft and are each slid by a corresponding one of shift forks each engaging a corresponding one of the slidable gears to connect/disconnect the rotational drive force between the slidable gear and the non-slidable gear coaxially adjacent thereto. A dog clutch is applied to between the slidable gear and the non-slidable gear coaxially adjacent to the slidable gear to transmit a rotational drive force by engagement of a dog tooth with a dog hole. Since the dog clutch is applied to between the slidable gear and the non-slidable gear, the connection/disconnection of the rotational drive force between the two axially adjacent gears can be executed by simple recessed and projected shapes. Thus, the configuration of the transmission can be simplified compared with the application of a synchromesh mechanism having a complicate structure for synchronizing the rotations of the adjacent speed-change gears. This makes it possible to reduce the size and weight of the twin clutch type speed-change apparatus.

According to an embodiment of the present invention, since the dog hole is formed in one, having a larger outside diameter, of the slidable gear and the non-slidable gear, it is less probable that one of the gears gets heavier. In addition, the dog clutch can be formed more easily compared with the case where the dog hole is formed in the gear with a smaller outside diameter.

According to an embodiment of the present invention, the shift fork is slidably attached to a guide shaft arranged parallel to the main shaft and to the countershaft and is slid along with turning of a shift drum provided parallel to the guide shaft. This can provide the twin clutch type speed-change apparatus that can execute shifting operation along with the turning of the shift drum. In addition, even when the twin clutch type speed-change apparatus is subjected automatic shifting control, it is possible to simultaneously control the speed and timing for driving the plurality of shift forks by controlling only one drive motor for turning the shift drums.

According to an embodiment of the present invention, the two guide shafts are provided for the shift forks, one of the guide shafts is attached with at least one shift fork adapted to drive the main shaft side slidable gear, and the other guide shaft is attached with at least one shift fork adapted to drive the countershaft side slidable gear. Thus, the twin clutch type speed-change apparatus can be provided in which the main shaft side shift fork and the counter shaft side shift fork are engaged with the respective individual guide shafts independent of each other.

According to an embodiment of the present invention, the twin clutch type speed-change apparatus is configured such that shifting between speed-change steps adjacent to each other by switching engaging and disengaging states of the twin clutch can be enabled by simultaneously engaging a dog clutch to be engaged when a rotational drive force is transmitted at a predetermined speed-change step and a dog clutch to be engaged when a rotational drive force is transmitted at a speed-change step adjacent to the predetermined speed-change step. Thus, quick shifting can be enabled without disconnection of the rotational drive force.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 includes a front view (a) of a first-speed driven gear and a cross-sectional view (b) taken along line D-D of FIG. 5(a);

FIG. 6 is a cross-sectional view taken along line E-E of FIG. 5(a);

FIG. 7 includes a front view (a) of a fifth-speed driven gear and a cross-sectional view (b) taken along line F-F of FIG. 7(a); and FIG. 8 is a cross-sectional view taken along line G-G of FIG. 7(a).

DETAILED DESCRIPTION OF THE PREFERRED EMBODIMENTS

Figure 1:
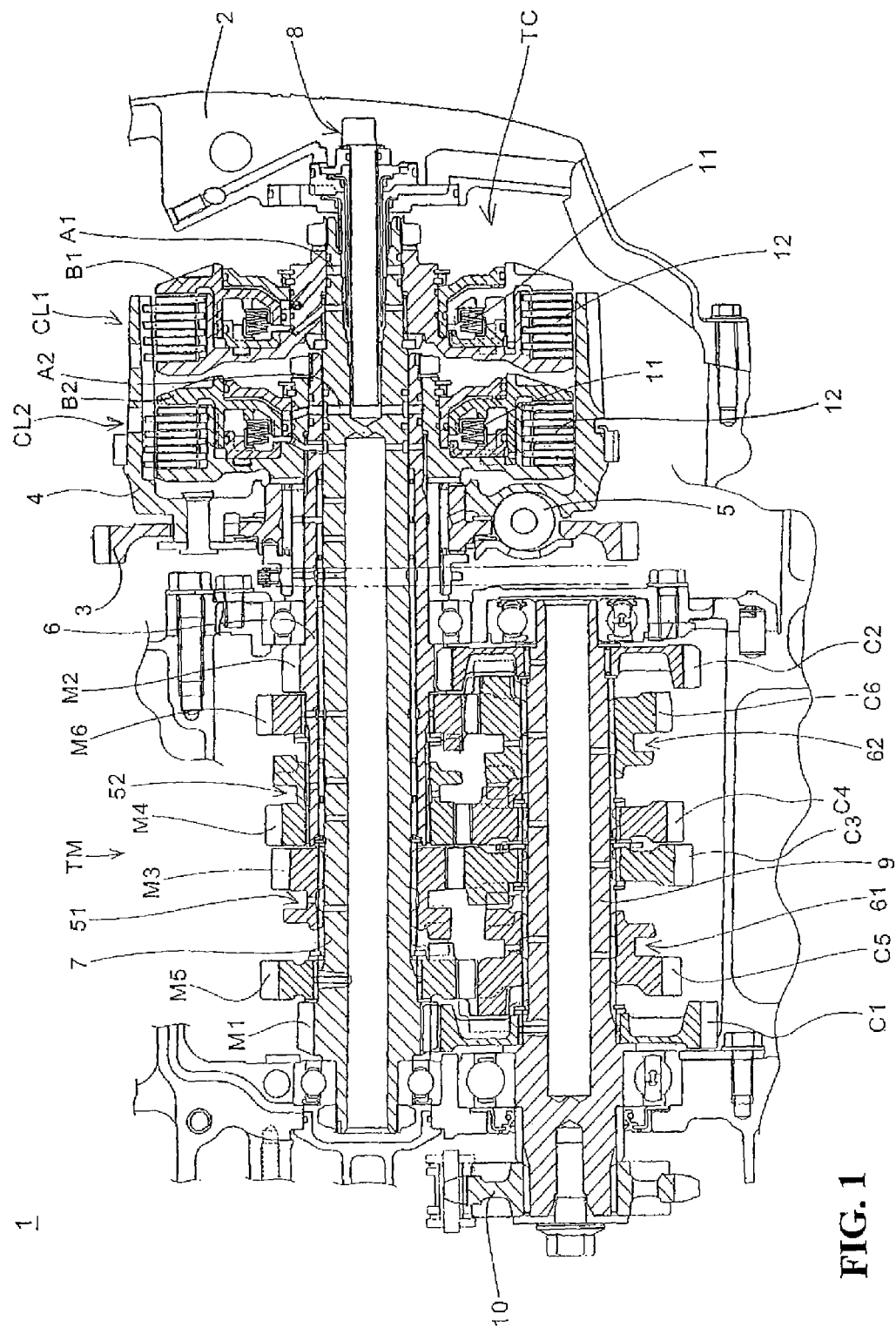
FIG. 1 is a cross-sectional view of a twin clutch type speed-change apparatus according to an embodiment of the present invention.
Figure 2:
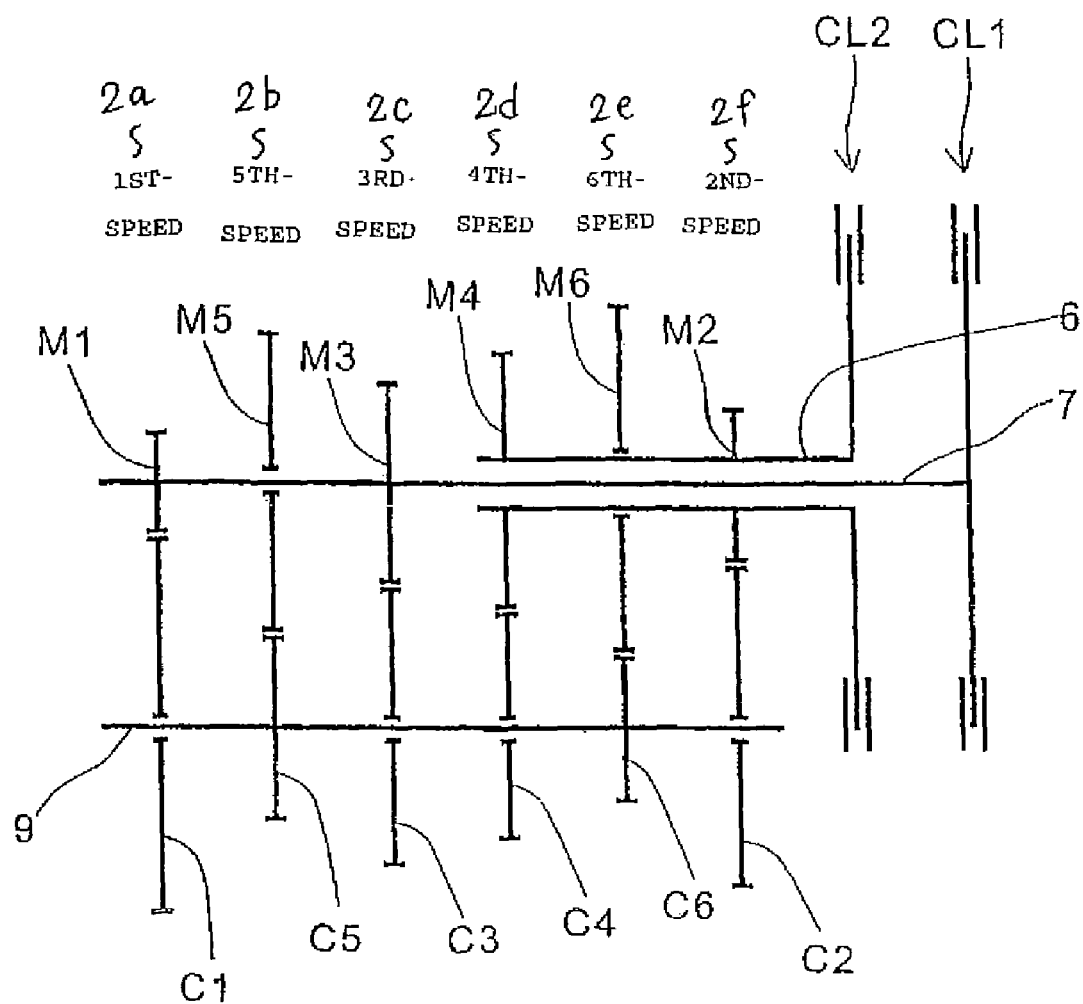
FIG. 2 is a skeleton view illustrating arrangement of speed-change gears of the speed-change apparatus.

A preferred embodiment of the present invention will hereinafter be described in detail with reference to the accompanying drawing. FIG. 1 is a cross-sectional view of a twin clutch type speed-change apparatus 1 according to an embodiment of the present invention. FIG. 2 is a skeleton diagram illustrating speed-change gear arrangement of the speed-change apparatus 1. The twin clutch speed-change apparatus includes a twin clutch TCL composed of a first clutch CL1 and a second clutch CL2, and a six-forward-speed sequential Transmission TM. The speed-change apparatus is accommodated inside a crankcase 2 together with an engine (not shown) as a power source of a vehicle.

A rotational drive power is transmitted from a crankshaft (not shown) of the engine to a primary gear 3 having a shock absorbing mechanism 5. The rotational drive power is outputted therefrom to a countershaft 9 attached with a drive sprocket through the twin clutch TCL, an outer main shaft 6 as an external tube, an inner main shaft 7 as an inner tube rotatably carried by the outer tube, and six gear pairs provided between the main shafts 6, 7 and a countershaft 9. The rotational driving force transmitted to the drive sprocket 10 is transmitted to a drive wheel (not shown) of a vehicle via a drive chain wound around the drive sprocket 10.

The Transmission TM has six gear pairs provided between the main shafts and the countershaft. The Transmission TM can select a gear pair through which the rotational drive force is outputted, based on the combination of the positions of slidable gears axially slidably carried on the respective shafts with the engagement/disengagement states of the first and second clutches CL1, CL2. The twin clutch TCL is disposed inside a clutch case 4 rotated integrally with the primary gear 3. The first clutch CL1 is non-rotatably mounted to the inner main shaft 7, whereas the second clutch CL2 is non-rotatably mounted to the outer main shaft 6. A clutch board 12 is disposed between the clutch case 4 and each of the clutches CL 1, CL2. The clutch board 12 is composed of four clutch plates non-rotatably carried by the clutch case 4 and four friction plates non-rotatably carried by each of the clutches CL1, CL2.

The first and second clutches CL1, CL2 are each configured to receive hydraulic pressure supplied from a hydraulic pump driven by the rotation of the crankshaft to allow the clutch board 12 to cause a frictional force, thereby switching into the engaging state. A distributor 8 which forms two double-pipe hydraulic paths inside the inner main shaft 7 is buried in the wall surface of the crankcase 2. If hydraulic pressure is supplied via the distributor 8 to an oil path A1 formed in the inner main shaft 7, a piston B1 is slid to the left in the figure against the elastic force of an elastic member 11 such as a spring or the like to switch the first clutch CL1 into the engaging state. Similarly, if hydraulic pressure is supplied to an oil path A2, a piston B2 is slid to the left to switch the second clutch CL2 into the engaging state. If the supplied hydraulic pressure is lowered, both the clutches CL1, CL2 are each returned to an original position by the elastic force of the elastic member 11. The supply of hydraulic pressure to the first or second clutches CL 1, CL2 is executed by a solenoid valve or the like switching the destination of the hydraulic pressure constantly produced by the hydraulic pump driven by the crankshaft.

With such a configuration described above, the rotational drive force of the primary gear 3 rotates only the clutch case 4 unless hydraulic pressure is supplied to the first clutch CL1 or the second clutch CL2. If the hydraulic pressure is supplied, the outer main shaft 6 or the inner main shaft 7 is drivingly rotated integrally with the clutch case 4. In addition, the magnitude of the supply hydraulic pressure is adjusted at this time to create a partial clutch engagement as well.

The inner main shaft 7 connected to the first clutch CL1 carries drive gears M1, M3, M5 for odd speed steps (first-speed, third-speed and fifth-speed). The first-speed drive gear M1 is formed integrally with the inner main shaft 7. The third-speed drive gear M3 is attached to the inner main shaft so as to be axially slidable and incapable of circumferential rotation. The fifth speed drive gear M5 is attached to the inner main shaft so as to be incapable of axial slide and circumferentially rotatable.

The outer main shaft 6 connected to the second clutch CL2 carries drive gears M2, M4, M6 for even speed steps (second-speed, fourth-speed and sixth-speed). The second-speed drive gear M2 is formed integrally with the outer main shaft 6. The fourth-speed drive gear M4 is attached to the outer main shaft so as to be axially slidable and incapable of circumferential rotation. The sixth speed drive gear M6 is attached to the outer main shaft so as to be incapable of axial slide and circumferentially rotatable.

The countershaft 9 carries driven gears C1, C2, C3, C4, C5 and C6 meshed with the drive gears M1, M2, M3, M4, M5, and M6, respectively. The first-through fourth-speed driven gears C1 through C4 are attached to the countershaft so as to be incapable of axial slide and circumferentially rotatable. The fifth- and sixth-speed driven gear C5, C6 are attached to the countershaft so as to be axially slidable and incapable of circumferential rotation.

The drive gears M3, M4 and driven gears C5, C6 of the gear trains described above, i.e., the axially slidable "slidable gears" are each configured to be slid along with the operation of a corresponding one of the shift forks described later. The slidable gears are respectively formed with engaging grooves 51, 52, 61 and 62 adapted to engage the claw portions of the shift forks.

The speed-change gears (the drive gears M1, M2, M5, M6 and the driven gears C1-C4) other than the slidable gears described above, i.e., the axially non-slidable "non-slidable" gears are configured to execute connection/disconnection of the rotational drive power with the adjacent slidable gears. The twin clutch type speed-change apparatus 1 according to the embodiment described above can optionally select one gear pair transmitting rotational drive force through the combination of the positions of the slidable gears with the engagement/disengagement of the first and second clutches CL1, CL2.

The first clutch CL1 executes the connection/disconnection of the rotational drive force of the odd speed-change steps (first-speed, third-speed and fifth-speed). On the other hand, the second clutch CL2 executes the connection/disconnection of the rotational drive force of the even speed steps (second-speed, fourth-speed and sixth-speed). Thus, if upshifting is sequentially executed, the engaging states of the first and second clutches CL1, CL2 are alternately switched.

In the twin clutch speed-change apparatus 1 of the present embodiment, a dog clutch mechanism is applied to a structure of connecting or disconnecting a rotational drive force between the slidable gear and the non-slidable gear. This dog clutch mechanism transmits the rotational drive force through meshing of the respective projected and recessed shapes of a dog tooth and a dog aperture. Thus, the simple configuration can transmit a drive force with less transmission loss. This can achieve the downsizing and weight-reduction of the twin clutch type speed-changing apparatus 1 by more simplifying the configuration of the transmission, compared with the configuration provided with a synchromesh mechanism between a slidable gear and a non-slidable gear to synchronize the rotations thereof.

Figure 3:
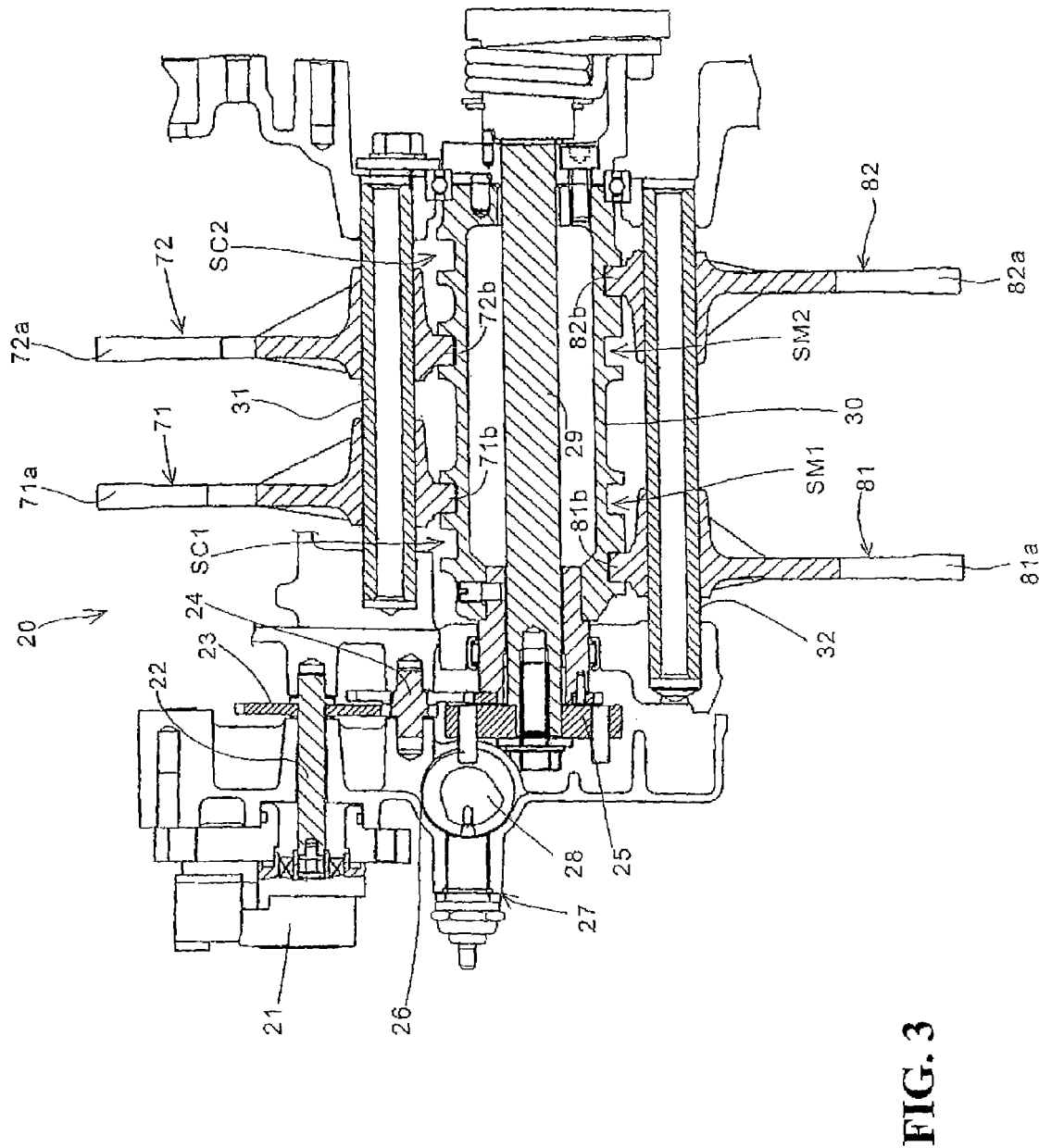
FIG. 3 is a cross-sectional view of a shifting mechanism which drives slidable gears of a transmission.
Figure 4:
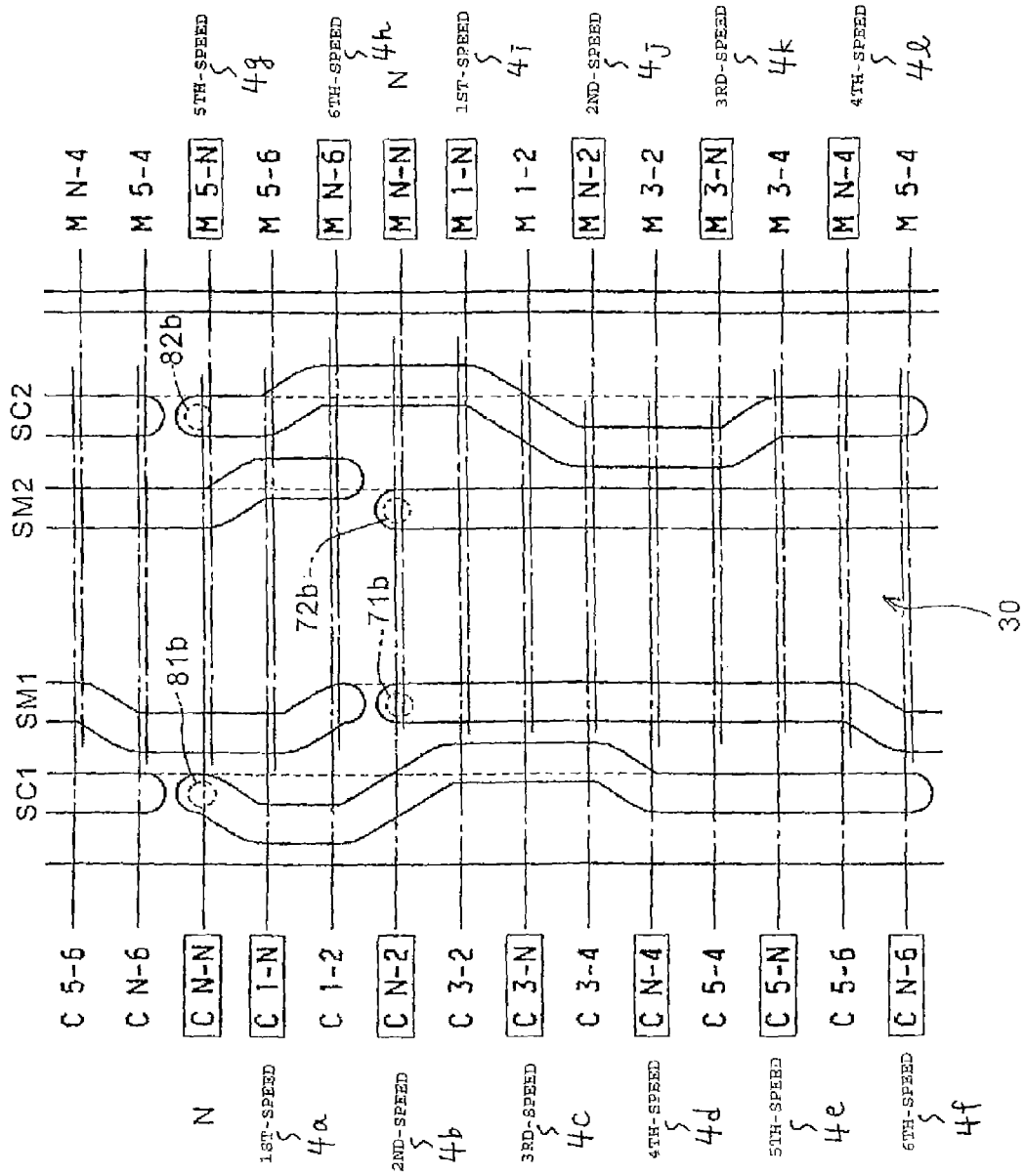
FIG. 4 is a development view illustrating the shapes of guide grooves of a shift drum.

FIG. 3 is a cross-sectional view of a shifting mechanism 20 which drives the slidable gears of the transmission. FIG. 4 is a development view illustrating the shapes of the guide grooves on a shift drum 30. To drive the four slidable gears mentioned above, the shifting mechanism 20 of the embodiment is provided with four shift forks 71, 72, 81, 82, more specifically, the shift forks 71, 72 that are slidably attached to the guide shaft 31 and the shift forks 81, 82 that are slidably attached to the guide shift 32. The four shift forks are provided with respective guide claws (71a, 72a, 81a, 82a) engaged with the corresponding stidable gears and with cylindrical projections (71b, 72b, 81b, 82b) engaged with the corresponding guide grooves formed on the shift drum 30.

The guide shaft 31 is attached with the shift fork 71 engaged with the third speed drive gear M3 and with the shift fork 72 engaged with the fourth speed drive gear M4. The other guide shaft 32 is attached with the shift fork 81 engaged with the fifth-speed driven gear C5 and with the shift fork 82 engaged with the sixth-speed driven gear C6.

Guide grooves SM1 and SM2 engaged with the main shaft side shift forks 71 and 72, respectively, and guide grooves SC1 and SC2 engaged with the countershaft side shift forks 81 and 82 are formed in the surface of the shift drum 30 disposed parallel to the guide shafts 31, 32. Thus, the slidable gears M3, M4, C5 and C6 are each driven along a corresponding one of the respective shapes of the four guide grooves along with turning of the shift drum 30.

The shift drum 30 is turnably driven to a predetermined position by an electric motor 21 as an actuator. The rotational drive force of the electric motor 21 is transmitted to a shift drum shaft 29 supporting the hollow cylindrical drum 30 via a first gear 23 secured to a rotational shaft 22 and via a second gear 24 meshed with the first gear 23. The electric motor 21 has a drive output parallel to the shift drum 30. The turned position of the shift drum 30 is detected by the shift position sensor 27. More specifically, the shift position sensor 27 detects it through the turned position of a sensor cam 28 turned by sensor pins 26 buried in a sensor plate 25 secured to the shift drum shaft 29.

With such a configuration described above, the twin clutch type speed-change apparatus 1 in parallel exercises the turning drive control on the shift drum 30 and the engagement/disengagement control on the twin clutch TCL. This can makes it possible to execute automatic gear shifting in response to engine revolutions and to vehicle speed or semi-automatic gear shifting subjected to rider's shifting operation by a shifting switch or the like.

A description is given of the positional relationship between the turning position of the shift drum 30 and the four shift forks with reference to the development view of FIG. 4. The guide shafts 31, 32 are disposed at respective positions spaced circumferentially apart from each other at about 90° with reference to the turning shaft of the shift drum 30. For example, if the turning position of the shift drum 30 is at neutral (N), the shift forks 81, 82 are located at a position indicated with "C N-N" on the left in FIG. 4, whereas the shift forks 71, 72 are located at a position indicated with "M N-N" on the right in FIG. 4. In FIG. 4, a broken line circle indicates the position of the cylindrical projection (71b, 72b, 81b, 82b) in each shift fork at the time of neutral. The predetermined turning positions downwardly continuous from indication "C N-N" on the left in FIG. 4 are provided at 30° intervals. Similarly, the predetermined turning positions downwardly continuous from indication "M N-N" on the right in FIG. 4 are provided at 30° intervals.

The sliding positions of the shift forks determined by the associated guide grooves are such that the guide grooves SM1, SM2 on the main shaft side each assume two positions, "the left position" and "the right position," whereas the guide grooves SC1, SC2 on the countershaft side each assume three position, "the left position," "the middle position" and "the right position."

The shift forks during neutral are located as follows: the shift fork 81: middle position, the shift fork 82: middle position, the shift fork 71: right position: and the shift fork 72: left position. This state is such that the four slidable gears driven by the respective associated shift forks are each not meshed with a corresponding one of the adjacent non-slidable gears. Thus, even if the first and second clutches CL1, CL2 are each engaged, the rotational drive force of the primary gear 3 is not transmitted to the countershaft 9.

If the shift drum 30 is turned to the position ("C 1-N" and "M 1-N") corresponding to the first-speed gear from the neutral position mentioned above, the shift fork 81 is switched from the middle position to the left position to cause the fifth-speed driven gear C5 to switch to the left position from the middle position. This allows the fifth-speed driven gear C5 to mesh with the first-speed driven gear C1 via the dog clutch, providing the rotational drive force-transmittable state. In this state, if the first clutch CL 1 is next switched to the engaging state, the rotational drive force is transmitted in the order of the inner main shaft 7, the first-speed drive gear M11 the first-speed driven gear C1, the fifth-speed driven gear C5 and the countershaft 9, and outputted from the drive sprocket 10.

When the upshifting to the first-speed gear is completed, the shift drum 30 is automatically turned in the upshifting direction by 30°. This operation is called "preliminary upshifting" which intends to complete shifting only by switching the engaging state of the twin clutch TCL when a command is issued to upshift from the first speed to the second speed. This preliminary upshifting allows the two guide shafts to move to the respective positions of "C 1-2" and "M 1-2" indicated on the left and right, respectively, of FIG. 4 relatively to the shift drum 30.

The changes of the guide grooves resulting from the preliminary upshifting are such that only the guide groove SC2 is switched from the middle position to the right position. This allows the shift fork 82 to be moved to the right position, thereby causing the driven gear C6 to mesh with the driven gear C2 via the dog clutch. At the time of completing the preliminary upshifting from the first speed to the second speed, since the second clutch CL2 is in the disengaging state, the outer main shaft 6 is turned in a following manner by the viscosity of the lubricating oil filled between the inner main shaft 7 and the outer main shaft 6.

The sliding operation of the driven gear C6 by the preliminary upshifting as described above completes a preparation for transmitting the rotational drive force via the second-speed gear. If a command is issued to upshift from the fist speed to the second speed in this state, the first clutch CL 1 is disengaged while the second clutch CL2 is switched to the engaging state. This switching operation of the twin clutch TCL instantaneously outputs the rotational drive force via the second-speed gear.

When the shifting operation from the first-speed to the second-speed is completed, the preliminary upshifting is executed to complete the shifting operation from the second speed to the third speed only by the switching of the twin clutch TCL. In the preliminary upshifting from the second-speed to the third-speed, the countershaft side guide shaft is moved to the position "C 3-2" from "C 1-2" indicated on the left in FIG. 4, while the main shaft side guide shaft is moved to the position "M 3-2" from "M1-2" on the right in FIG. 4. The changes of the guide grooves resulting from such movements are such that only the guide groove SC1 switches from the left position to the right position. This allows the shift fork 81 to be moved from the left position to the right position, thereby causing the fifth-speed driven gear C5 and the third-speed driven gear C3 to be meshed with each other via the dog clutch.

When the preliminary upshifting from the second-speed to the third-speed is completed, the engaging state of the twin clutch TCL is switched from the second clutch CL2 to the first clutch CL1. In other words, only the switching of the clutches provides the state where the shifting operation from the second speed to the third speed is executable. This preliminary upshifting can similarly be executed from then until the fifth-speed gear is selected.

During the preliminary upshifting from the second-speed to the third-speed described above, the guide groove SCI passes the middle position of "C N-2" indicated on the left side in FIG. 4, i.e., the position where the meshing of the dog clutch is not executed. The angle of the shift drum 30 is detected by the shift position sensor 27 at 30° intervals and the turning speed of the shift drum can minutely be adjusted by the electric motor 21. This can allow e.g., the turning speed from "C 1-2" to "C 1-2" indicated on the left in FIG. 4, i.e., the speed encountered when the meshing of the dog clutch is released between the driven gears C1, C5 to differ from the turning speed from "C N-2" to "NC-3", i.e., the speed encountered when the dog clutch is engaged between the driven gears C5, C3. In addition, this can execute "neutral-waiting" where the shift drum 30 stops for predetermined time at the position of "C N-2." Thus, it is possible to significantly reduce shift shock liable otherwise to occur at the time of the engagement/disengagement of the dog clutch. Further, the drive timing and drive speed of the shift drum 30 can sequentially be adjusted according to the speed-change steps and engine revolutions during shifting.

FIG. 5 includes a front view (a) of the first-speed driven gear C1 and a cross-sectional view (b) taken along line D-D. FIG. 6 is a cross-sectional view taken along line E-E of FIG. 5(a). FIG. 7 includes a front view of the fifth-speed driven gear C5 and a cross-sectional view taken along line F-F of FIG. 7(a). FIG. 8 is a cross-sectional view taken along line G-G of FIG. 7(a). As described above, the driven gears C1, C5 are the gear pair and are axially meshed with each other by the dog clutch, thereby transmitting the rotational drive force transmitted from the inner main shaft 7 via the first speed drive gear M1 to the countershaft 9.

The first-speed driven gear C1 is a non-slidable gear that is attached to the countershaft 9 so as to be incapable of axial sliding and capable of circumferential rotation with respect to the countershaft 9. The fist speed driven gear C1 is formed with four dog holes 35 each shaped in a general sector. The dog holes 35 are sectioned by four walls 36 rectangular in section.

The fifth-speed driven gear C5 is a slidable gear that is attached to the countershaft 9 so as to be axially slidable and incapable of circumferential rotation. The fifth-speed driven gear C5 is formed with eight dog teeth formed to have the same shape as viewed from the axial direction. The dog teeth are configured such that two types of dog teeth 55, 56 different in axial height from each other are alternately arranged. The dog teeth 55, 56 are circumferentially spaced apart from each other at regular intervals. When the dog teeth 55, 56 are meshed with the dog holes 35 of the slidable gear C1, the dog teeth 55, 56 adjacent to each other are inserted into one dog hole 35.

When the fifth-speed driven gear C5 approaches the rotating first-speed driven gear C1 in engaging the dog clutch, the long dog tooth 55 comes into abutment against the wall 36 before the short dog tooth 56. Thereafter, the two dog teeth 55, 56 come into engagement with a single dog hole 35. In this way, the rotational drive force of the first-driven gear C1 is transmitted to the fifth-speed driven gear C5 via the long dog teeth 55 stronger than the short dog teeth 56.

According to the configuration where the dog teeth engaged with the single dog hole is provided with the steps as described above, the circumferential gap defined between the wall and the dog tooth when the dog teeth is inserted can be reduced. During traveling at the first-speed, this circumferential gap is defined between the short dog tooth 56 and the wall 36. The gap is significantly small compared with that of the existing configuration where e.g., the dog clutch is composed of only four dog teeth 55. In the twin clutch type speed-change apparatus 1 according to the present embodiment, since the first clutch CL1 is switched to the second clutch CL2 when upshifting is executed from the first-speed to the second-speed, a plane where the dog tooth and the dog hole is abutted against each other is switched to a lateral surface of the short dog tooth 56 from a lateral surface of the long dog tooth 55. In this case, since the gap between the dog tooth 56 and the wall of the dog hole 35 is small, the occurrence of noise and shock during the abutment can significantly be reduced. Thus, it is possible to reduce the shift shock occurring during upshifting from the first-speed to the second-speed. In addition, in the present embodiment, the configuration where the dog teeth engaged with the single dog hole is provided with the steps is applied to only the dog clutch between the first-speed driven gear C1 and the fifth-speed driven gear C5.

According to the twin clutch type speed-change apparatus pertaining to the present invention as described above, the dog clutch adapted to transmit the rotational drive force by engaging the dog teeth with the dog hole is applied to between the slidable gear slidably attached to the main shaft or the countershaft and the non-slidably gear coaxially adjacent to the slidable gear. The connection/disconnection of the rotational drive force between the slidable gear and the non-slidable gear can be executed by engagement of the recessed and projected shapes. Thus, it is possible to simplify the configuration of the transmission compared with the application of a synchromesh mechanism having a complicate structure to synchronize the rotations of the adjacent speed-change gears. Thus, it is possible to reduce the size and weight of the twin clutch type speed-change apparatus.

In addition, the shapes of the dog tooth and dog hole of the dog clutch, the number of steps of the speed-change gears and the like are not limited to the embodiment described above and can be modified in various ways. For example, the two clutches constituting the twin clutch may each be arranged so as to be opposed to a corresponding one of the front and rear surfaces of the primary gear. In addition, the number of gear trains of the transmission may include a plurality of forward speed-change steps and a reverse speed-change step.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A twin clutch type speed-change apparatus comprising:
a transmission having a plurality of gear pairs disposed between a main shaft and a countershaft; and
a twin clutch provided on the main shaft, a rotational drive force from a power source being connected/disconnected between the transmission and the power source by the twin clutch;
wherein the main shaft is composed of an inner tube carrying odd speed-change step gears and an outer tube carrying even speed-change step gears;
the twin clutch includes a first clutch adapted to connect/disconnect a rotational drive force transmitted to the inner tube and a second clutch adapted to connect/disconnect a rotational drive force to the outer tube;
the gear pairs are each composed of an axially slidably attached slidable gear and axially non-slidably attached non-slidable gear to select one gear pair for transmitting the rotational drive force to the countershaft;
the slidable gears are each provided on a corresponding one of the inner tube, the outer tube and the countershaft and are each slid by a corresponding one of shift forks each engaging a corresponding one of the slidable gears to connect/disconnect the rotational drive force between the slidable gear and the non-slidable gear coaxially adjacent thereto; and
a dog clutch is applied between the slidable gear and the non-slidable gear coaxially adjacent to the slidable gear to transmit a rotational drive force by engagement of two dog teeth with each of four dog holes, wherein the two dog teeth engaged with each of the four dog holes is applied to only the dog clutch between a first-speed driven gear (C1) and a fifth-speed driven gear (C5).

2. The twin clutch type speed-change apparatus according to claim 1, wherein one of the slidable gear and the non-slidable gear has an outside diameter that is larger than an outside diameter of the other of the slidable gear and the non-slidable gear, and the dog hole is formed in the one of the slidable gear and the non-slidable gear having the larger diameter.

3. The twin clutch type speed-change apparatus according to claim 1, wherein,
two of the guide shafts are provided for the shift forks;
one of the guide shafts is attached with at least one shift fork adapted to drive the main shaft side slidable gear; and
the other guide shaft is attached with at least one shift fork adapted to drive the countershaft side slidable gear.

4. The twin clutch type speed-change apparatus according to claim 1, wherein shifting between speed-change steps adjacent to each other by switching engaging and disengaging states of the twin clutch can be enabled by simultaneously engaging the dog clutch to be engaged when the rotational drive force is transmitted at a predetermined speed-change step and the dog clutch to be engaged when a rotational drive force is transmitted at a speed-change step adjacent to the predetermined speed-change step.

5. The twin clutch type speed-change apparatus according to claim 2, wherein shifting between speed-change steps adjacent to each other by switching engaging and disengaging states of the twin clutch can be enabled by simultaneously engaging the dog clutch to be engaged when the rotational drive force is transmitted at a predetermined speed-change step and the dog clutch to be engaged when a rotational drive force is transmitted at a speed-change step adjacent to the predetermined speed-change step.

6. The twin clutch type speed-change apparatus according to claim 3, wherein shifting between speed-change steps adjacent to each other by switching engaging and disengaging states of the twin clutch can be enabled by simultaneously engaging the dog clutch to be engaged when the rotational drive force is transmitted at a predetermined speed-change step and the dog clutch to be engaged when a rotational drive force is transmitted at a speed-change step adjacent to the predetermined speed-change step.

7. A twin clutch type speed-change apparatus comprising:
a transmission having a plurality of gear pairs disposed between a main shaft and a countershaft;
a twin clutch operatively positioned relative to the main shaft, a rotational drive force from a power source being connected/disconnected between the transmission and the power source by the twin clutch;
said main shaft includes an inner tube and an outer tube, said inner tube carrying odd speed-change step gears, said outer tub carrying even speed-change step gears;
said twin clutch includes a first clutch and a second clutch, said first clutch being adapted to connect/disconnect a rotational drive force transmitted to the inner tube and said second clutch being adapted to connect/disconnect a rotational drive force to the outer tube;
said gear pairs being each composed of an axially slidably attached slidable gear and axially non-slidably attached non-slidable gear to select one gear pair for transmitting the rotational drive force to the countershaft;
the slidable gears are each provided on a corresponding one of the inner tube, the outer tube and the countershaft and are each slid by a corresponding one of shift forks each engaging a corresponding one of the slidable gears to connect/disconnect the rotational drive force between the slidable gear and the non-slidable gear coaxially adjacent thereto; and
a dog clutch operatively provided relative to the slidable gear and the non-slidable gear coaxially adjacent to the slidable gear to transmit a rotational drive force by engagement of two dog teeth with each of four dogs holes, wherein the two dog teeth engaged with each of the four dog holes is applied to only the dog clutch between a first-speed driven gear (C1) and a fifth-speed driven gear (C5).

8. The twin clutch type speed-change apparatus according to claim 7, wherein one of the slidable gear and the non-slidable gear has an outside diameter that is larger than an outside diameter of the other of the slidable gear and the non-slidable gear, and the dog hole is formed in the one of the slidable gear and the non-slidable gear having the larger diameter.

9. The twin clutch type speed-change apparatus according to claim 7, wherein,
two of the guide shafts are provided for the shift forks;
one of the guide shafts is attached with at least one shift fork adapted to drive the main shaft side slidable gear; and
the other guide shaft is attached with at least one shift fork adapted to drive the countershaft side slidable gear.

10. The twin clutch type speed-change apparatus according to claim 7, wherein shifting between speed-change steps adjacent to each other by switching engaging and disengaging states of the twin clutch can be enabled by simultaneously engaging the dog clutch to be engaged when the rotational drive force is transmitted at a predetermined speed-change step and the dog clutch to be engaged when a rotational drive force is transmitted at a speed-change step adjacent to the predetermined speed-change step.

11. The twin clutch type speed-change apparatus according to claim 8, wherein shifting between speed-change steps adjacent to each other by switching engaging and disengaging states of the twin clutch can be enabled by simultaneously engaging the dog clutch to be engaged when the rotational drive force is transmitted at a predetermined speed-change step and the dog clutch to be engaged when a rotational drive force is transmitted at a speed-change step adjacent to the predetermined speed-change step.

12. The twin clutch type speed-change apparatus according to claim 9, wherein shifting between speed-change steps adjacent to each other by switching engaging and disengaging states of the twin clutch can be enabled by simultaneously engaging the dog clutch to be engaged when the rotational drive force is transmitted at a predetermined speed-change step and the dog clutch to be engaged when a rotational drive force is transmitted at a speed-change step adjacent to the predetermined speed-change step.

13. The twin clutch type speed-change apparatus according to claim 1,
wherein the shift fork is slidably attached to a guide shaft arranged parallel to the main shaft and to the countershaft and is slid along with turning of a hollow, cylindrical drum provided parallel to the guide shaft, and
an electric motor provided on a crankcase has a drive output parallel to the shift drum,
wherein the rotational drive force of the drive output is transmitted to a shift drum shaft supporting the shift drum via a first gear secured to a rotational shaft which is directly connected to the drive output and via a second gear meshed with the first gear.

14. The twin clutch type speed-change apparatus according to claim 7,
wherein the shift fork is slidably attached to a guide shaft arranged parallel to the main shaft and to the countershaft and is slid along with turning of a hollow, cylindrical shift drum provided parallel to the guide shaft, and
an electric motor provided on a crankcase has a drive output parallel to the shift drum,
wherein the rotational drive force of the drive output is transmitted to a shift drum shaft supporting the shift drum via a first gear secured to a rotational shaft which is directly connected to the drive output and via a second gear meshed with the first gear.

* * * * *